United States Patent
Lu

(10) Patent No.: US 10,937,128 B2
(45) Date of Patent: Mar. 2, 2021

(54) SUB-IMAGE BASED IMAGE GENERATION

(71) Applicant: Advanced New Technologies Co., Ltd., George Town (KY)

(72) Inventor: Weiqin Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 107 days.

(21) Appl. No.: 16/202,609

(22) Filed: Nov. 28, 2018

(65) Prior Publication Data

US 2019/0108616 A1     Apr. 11, 2019

Related U.S. Application Data

(63) Continuation of application No. PCT/CN2017/080863, filed on Apr. 18, 2017.

(30) Foreign Application Priority Data

May 31, 2016 (CN) .......................... 201610374626.8

(51) Int. Cl.
  *G06K 9/00* (2006.01)
  *G06T 3/40* (2006.01)
  (Continued)

(52) U.S. Cl.
  CPC ........ *G06T 3/4038* (2013.01); *G06F 16/5866* (2019.01); *G06T 9/00* (2013.01);
  (Continued)

(58) Field of Classification Search
  CPC ......... G06T 3/4038; G06T 9/00; G06T 11/00; G06F 16/5866
  See application file for complete search history.

(56) References Cited

U.S. PATENT DOCUMENTS 6,141,012 A * 10/2000 Bollman ................. G06T 11/60
                                                            345/418
6,611,241 B1 * 8/2003 Firester ................. G09F 9/3026
                                                            345/1.3
(Continued)

FOREIGN PATENT DOCUMENTS

CN      102622628      8/2012
CN      102651138      8/2012
(Continued)

OTHER PUBLICATIONS

International Preliminary Report on Patentability in International Application No. PCT/CN2017/080863, dated Dec. 4, 2018, 11 pages (with English Translation).
(Continued)

*Primary Examiner* — Amir Alavi
(74) *Attorney, Agent, or Firm* — Fish & Richardson P.C.

(57) ABSTRACT

An image generation request is received, where the image generation request includes an image format of an image for generation. A static image corresponding to the received image generation request is obtained. Based on the image format, a plurality of sub-images for generation and corresponding to the image awaiting generation based on the image format is determined. Description information is obtained for each sub-image of the plurality of sub-images. Based on the description information for each sub-image, the plurality of sub-images are sorted as a plurality of sorted sub-images. The image is generated by generating, pre-processing, and adding each particular sub-image of the plurality of sub-images to an image file corresponding to the image format.

18 Claims, 5 Drawing Sheets

(51) Int. Cl.
*H04N 19/426* (2014.01)
*G06F 16/58* (2019.01)
*G06T 9/00* (2006.01)
*G06T 11/00* (2006.01)
*H04N 19/117* (2014.01)
*H04N 19/129* (2014.01)
*H04N 19/46* (2014.01)
*H04N 19/174* (2014.01)
*H04N 19/176* (2014.01)
*H04N 19/162* (2014.01)

(52) U.S. Cl.
CPC .......... *G06T 11/00* (2013.01); *H04N 19/426* (2014.11); *H04N 19/117* (2014.11); *H04N 19/129* (2014.11); *H04N 19/162* (2014.11); *H04N 19/174* (2014.11); *H04N 19/176* (2014.11); *H04N 19/46* (2014.11)

(56) References Cited

U.S. PATENT DOCUMENTS

| | | | |
|---|---|---|---|
| 8,004,582 B2* | 8/2011 | Koutaki | H04N 5/772 348/231.2 |
| 8,369,652 B1* | 2/2013 | Khosla | G06K 9/4623 382/284 |
| 8,503,802 B1 | 8/2013 | Ding | |
| 8,547,444 B2* | 10/2013 | Kinrot | G06T 5/003 348/208.99 |
| 8,965,140 B1* | 2/2015 | Xu | G06K 9/38 382/195 |
| 9,176,473 B1* | 11/2015 | Lieberman | G06K 15/1849 |
| 10,068,363 B2* | 9/2018 | Laaksonen | G06T 13/80 |
| 10,318,573 B2* | 6/2019 | Golbandi | G06T 11/60 |
| 2008/0159708 A1* | 7/2008 | Kazama | H04N 21/44008 386/333 |
| 2011/0087794 A1 | 4/2011 | Li et al. | |
| 2013/0308699 A1 | 11/2013 | Musser, Jr. et al. | |
| 2014/0369421 A1 | 12/2014 | Zhu et al. | |
| 2015/0178881 A1 | 6/2015 | Qian et al. | |
| 2019/0108616 A1* | 4/2019 | Lu | G06F 16/5866 |

FOREIGN PATENT DOCUMENTS

| | | |
|---|---|---|
| CN | 103778631 | 5/2014 |
| CN | 104143109 | 11/2014 |
| CN | 104881470 | 9/2015 |
| CN | 105245881 | 1/2016 |
| CN | 105488132 | 4/2016 |
| CN | 105516618 | 4/2016 |
| TW | 201023094 | 6/2010 |
| TW | 201044314 | 12/2010 |
| TW | I384413 | 2/2013 |
| TW | 201409097 | 3/2014 |

OTHER PUBLICATIONS

Minying, "Research and Implementation of Automatic Photo Typesetting System", Wanfang Database, Apr. 2015, 66 pages (with English abstract).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Bottreau et al., "Logo Insertion," Document JVT-R016, Joint Video Team (JVT) of ISO/IEC MPEG & ITU-T VCEG (ISO/IEC JTC1/SC29/WG11 and ITU-T SG16 Q.6), 18th Meeting, Jan. 2006, 12 pages.

European Extended Search Report in European Application No. 17805551.3, dated Mar. 11, 2019, 12 pages.

International Search Report by the International Searching Authority issued in International Application No. PCT/CN2017/080863 dated Jul. 12, 2017; 9 pages.

* cited by examiner

SUB-IMAGE BASED IMAGE GENERATION

CROSS-REFERENCE TO RELATED APPLICATIONS

This application is a continuation of PCT Application No. PCT/CN2017/080863, filed on Apr. 18, 2017, which claims priority to Chinese Patent Application No. 201610374626.8, filed on May 31, 2016, and each application is hereby incorporated by reference in its entirety.

TECHNICAL FIELD

The present application relates to the field of image processing technologies, and in particular, to an image generation method and device.

BACKGROUND

In existing technologies, when a target image is being generated, a base image is first loaded or generated in a memory, then more image information is drawn on the base image until complete image information is formed in the memory, and finally the target image is generated based on the complete image information in the memory. However, when the target image is relatively large, the complete image information stored in the memory occupies massive memory space. For example, when the target image is a 1024×1024 true color image, the target image occupies memory space of more than 4 megabytes. It consumes memory resources of a computer.

SUMMARY

Implementations of the present application provide an image generation method and device, to save memory resources of a computer.

According to a first aspect, an image generation method is provided, and the method includes receiving an image generation request, where the image generation request includes an image format of an image awaiting generation; obtaining a corresponding static image based on the received image generation request; determining a plurality of sub-images awaiting generation of the image awaiting generation based on the image format; obtaining description information of each sub-image awaiting generation, and sorting the plurality of sub-images awaiting generation based on the description information; generating the first sub-image based on description information of the first sub-image awaiting generation in the plurality of sorted sub-images awaiting generation, a predetermined image generation algorithm, and the static image; preprocessing the first sub-image, and adding the preprocessed first sub-image to an image file that satisfies the image format; and sequentially performing operations of generating, preprocessing, and adding other sub-images awaiting generation in the plurality of sorted sub-images awaiting generation based on a method for generating, preprocessing, and adding the first sub-image, until the image awaiting generation is obtained.

According to a second aspect, an image generation device is provided, and the device includes a receiving unit, configured to receive an image generation request, where the image generation request includes an image format of an image awaiting generation; an acquisition unit, configured to obtain a corresponding static image based on the image generation request received by the receiving unit; a determining unit, configured to determine a plurality of sub-images awaiting generation of the image awaiting generation based on the image format; a sorting unit, configured to obtain description information of each sub-image awaiting generation that is determined by the determining unit, and sort the plurality of sub-images awaiting generation based on the description information; a generation unit, configured to generate the first sub-image based on description information of the first sub-image awaiting generation in the plurality of sub-images awaiting generation that are sorted by the sorting unit, a predetermined image generation algorithm, and the static image; and a preprocessing unit, configured to preprocess the first sub-image generated by the generation unit, and add the preprocessed first sub-image to an image file that satisfies the image format, where the acquisition unit is further configured to sequentially perform operations of generating, preprocessing, and adding other sub-images awaiting generation in the plurality of sorted sub-images awaiting generation based on a method for generating, preprocessing, and adding the first sub-image, until the image awaiting generation is obtained.

According to the image generation method and device provided in the present application, the description information of each sub-image awaiting generation of the image awaiting generation is determined based on the image format of the image awaiting generation, the sub-images awaiting generation are sorted based on the description information, and the sub-images are generated in sequence. In a process of generating the sub-images in sequence, each time a sub-image is generated, the sub-image is added to the image file after being preprocessed. When all the sub-images are stored in the image file, all the sub-images form the image awaiting generation. It can be seen that the sub-images are generated in sequence in the present application. In other words, only information about one sub-image needs to be stored in a memory, thereby alleviating the problem in the existing technology that the memory resources of the computer are wasted because complete information of the image awaiting generation needs to be stored in the memory.

DESCRIPTION OF IMPLEMENTATIONS

The following describes implementations of the present disclosure with reference to accompanying drawings.

An image generation method and device provided in the present application are applicable to generating an image that occupies massive storage space, and in particular, to generating an image that occupies massive storage space on a server device. The server device corresponds to a plurality of client devices. In other words, the server device provides a service of generating an image for the plurality of client devices. It is worthwhile to note that an image format of an image generated according to the previously described generation method includes but is not limited to JPEG, TIFF, RAW, BMP, GIF, PNG, etc.

Figure 1:
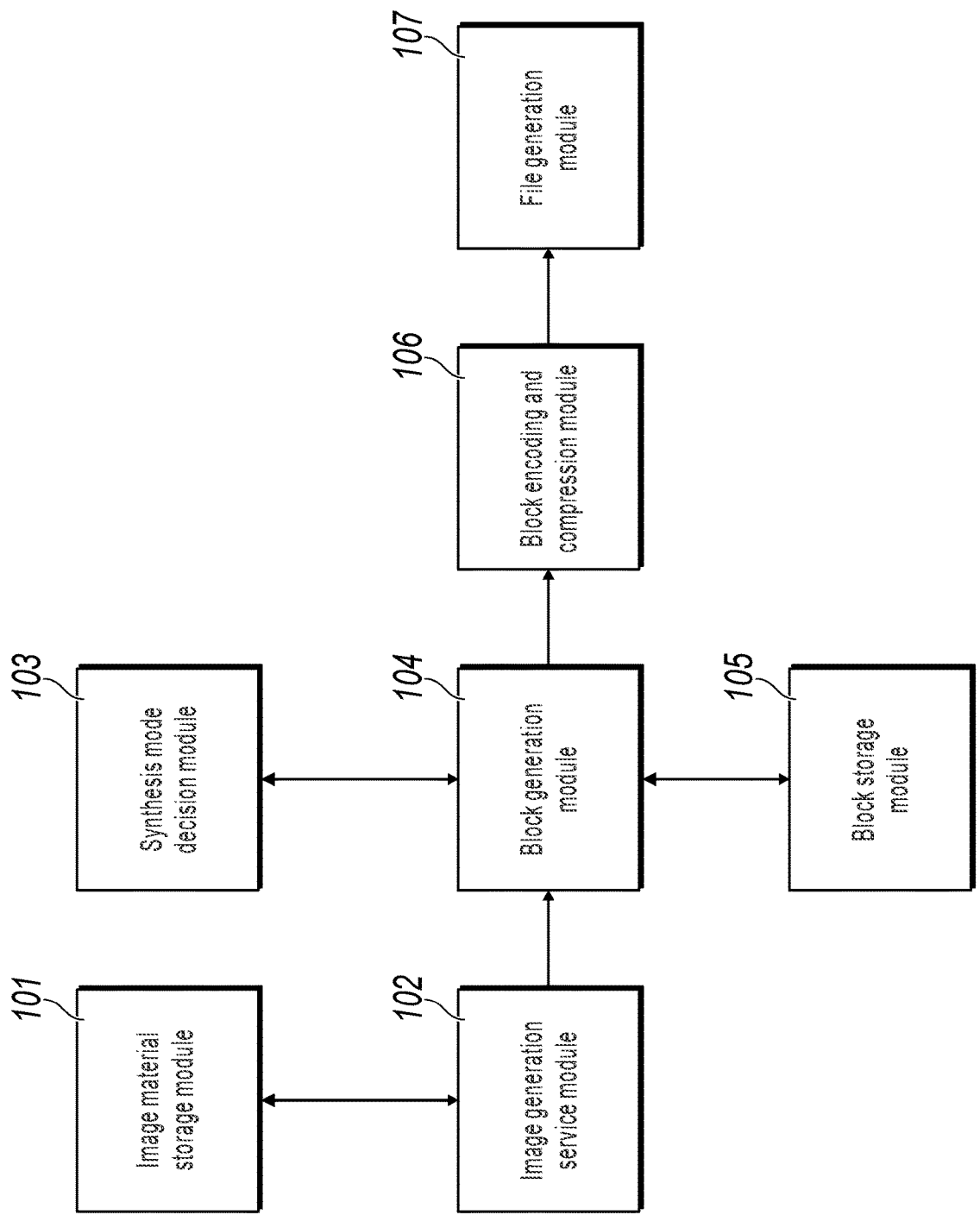
FIG. 1 is a schematic diagram illustrating an image synthesis device, according to the present application.

The image generation method in the present application can be performed by an image synthesis device shown in FIG. 1. The image synthesis device can run on a server device, such as a server device of the ALIPAY system. The image synthesis device shown in FIG. 1 includes an image material storage module 101, an image generation service module 102, a synthesis mode decision module 103, a block generation module 104, a block storage module 105, a block encoding and compression module 106, and a file generation module 107.

The image material storage module 101 is configured to store a static image, for example, a background image, a foreground image, and a static text. It can be understood that when the image synthesis device generates images of different formats for different client devices, the static image can usually be shared.

The image generation service module 102 is configured to receive an image generation request sent by a client device, where the image generation request can include an image format of an image awaiting generation; and read a corresponding static image from the image material storage module 101 based on the image generation request. For example, when a user of the client device wants to generate a target image in which the first image is used as a background image and the second image is used as a foreground image, the image generation request sent by the client device to the image synthesis device can further include a name of the first image and a name of the second image, so that the image generation service module 102 obtains the first image and the second image from the image material storage module 101 based on the name of the first image and the name of the second image.

The synthesis mode decision module 103 is configured to determine, based on the image format of the image awaiting generation, whether the image awaiting generation can be generated in blocks. If the image awaiting generation can be generated in blocks, the synthesis mode decision module 103 is further configured to determine description information of an image awaiting generation that is obtained after block partitioning. The image awaiting generation that is obtained after block partitioning can be referred to as a sub-image awaiting generation. The description information of the sub-image awaiting generation can include the number of pixels included in the sub-image awaiting generation and location information of each pixel in the sub-image awaiting generation. For example, assume that the image awaiting generation is a 1024×1024 PNG image, a determination result of the synthesis mode decision module 103 is that the image awaiting generation can be generated in blocks, each sub-image awaiting generation includes 1024 pixels, and the 1024 pixels are all in one row, for example, all in the first row or the second row. For another example, if the image awaiting generation is a 1024×1024 JPEG image, because an image in a JPEG format is displayed in grids, it can be further assumed that the image awaiting generation includes 64×64 grids, and each grid includes 16×16 pixels, then a determination result of the synthesis mode decision module 103 is that the image awaiting generation can be generated in blocks, and each sub-image awaiting generation includes 16×16 pixels. In other words, each sub-image awaiting generation includes the pixels in one grid. In addition, the synthesis mode decision module 103 is further configured to store a predetermined image generation algorithm. The predetermined image algorithm is used to generate each pixel in the sub-image awaiting generation. In an example, when a two-dimensional (2D) code image that includes user information needs to be generated, each pixel in the sub-image awaiting generation can be generated with reference to the predetermined image generation algorithm and 2D code information corresponding to the user information. The 2D code information here can be generated by the image generation service module 102 based on the user information, and the at least one location, color (e.g., black or white), etc. in the image awaiting generation are described in the 2D code information.

The block generation module 104 is configured to generate a pixel in each sub-image awaiting generation. The block generation module 104 can first receive the image generation request and the static image that are forwarded by the image generation service module 102, then send an access request to the synthesis mode decision module 103 to obtain description information of each sub-image awaiting generation and the predetermined image generation algorithm, and finally generate each sub-image in sequence based on the description information of each sub-image awaiting generation, the predetermined image generation algorithm, and the static image.

The block storage module 105 is configured to store each pixel generated by the block generation module 104 when the block generation module 104 generates each sub-image. When all pixels in one sub-image are generated, in other words, when the block storage module 105 stores all the pixels in the sub-image, the block storage module 105 sends all the pixels in the sub-image to the block encoding and compression module 106. It is worthwhile to note that after the block storage module 105 sends all pixels in one sub-image to the block encoding and compression module 106, the block storage module 105 can be configured to store pixels in a next sub-image. In other words, the block storage module 105 in the present application can be reused, thereby effectively utilizing memory resources of a computer.

The block encoding and compression module 106 is configured to encode and compress a sub-image based on the image format of the image awaiting generation. Encoding and compressing the image based on the image format of the image awaiting generation are conventional technologies. Details are omitted here for simplicity. After encoding and compressing the sub-image, the block encoding and compression module 106 sends the encoded and compressed sub-image to the file generation module 107.

The file generation module 107 is configured to initially generate an image file that satisfies the image format of the image awaiting generation. It can be understood that the image file includes only description information of the image format of the image awaiting generation, and does not include any pixel. Each time the file generation module 107 receives an encoded and compressed sub-image sent by the block encoding and compression module 106, the file generation module 107 adds the encoded and compressed sub-image to the image file. When adding all the sub-images to the image file, the file generation module 107 adds necessary information (e.g., security check information or integrity check information) to the image file. Then, the image awaiting generation can be generated.

Figure 2:
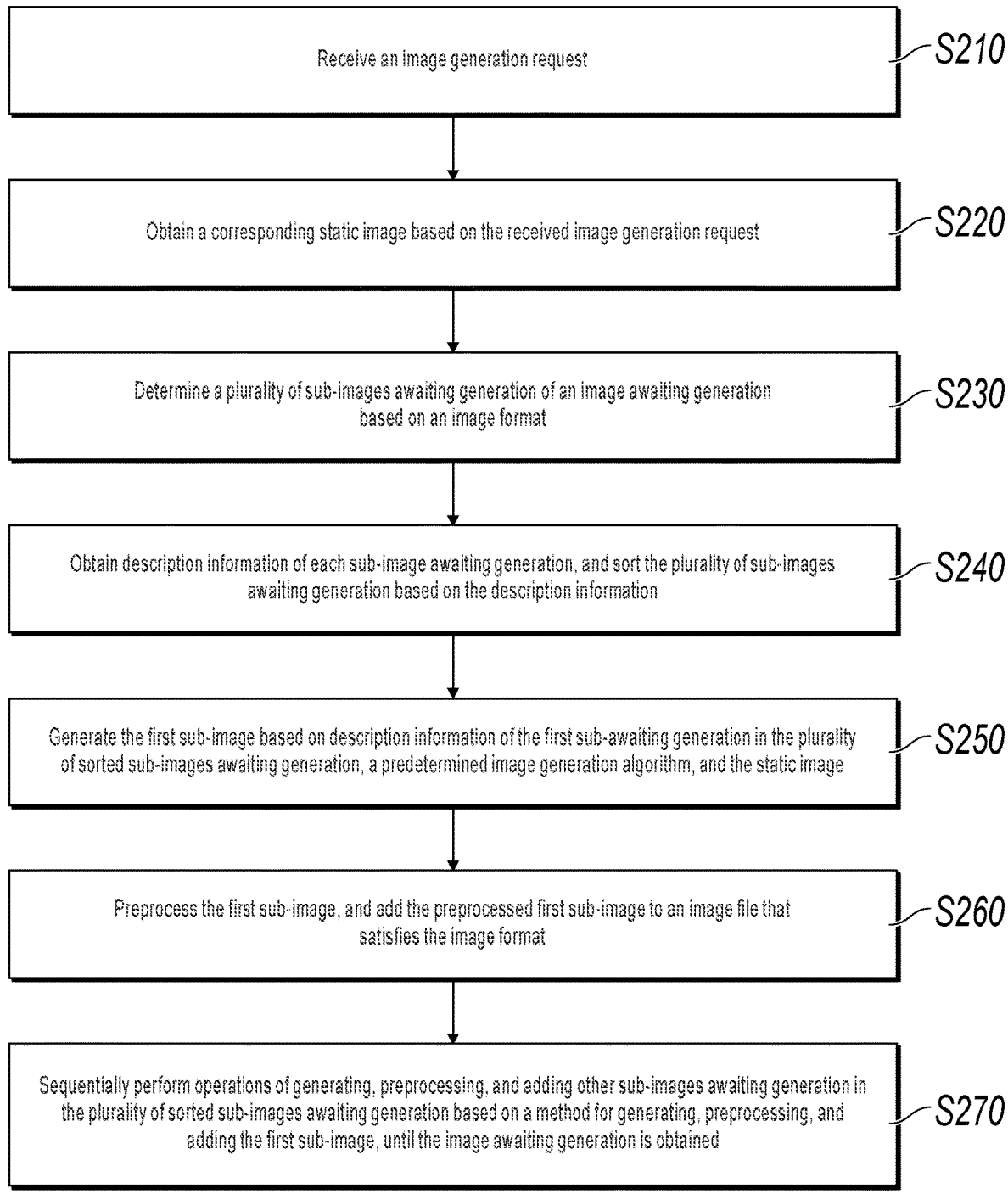
FIG. 2 is a flowchart illustrating an image generation method, according to an implementation of the present application.

For a method for generating an image by the image synthesis device, references can be made to FIG. 2. In FIG. 2, the method can include the following steps.

Step 210: Receive an image generation request, where the image generation request includes an image format of an image awaiting generation.

The image generation request here can be sent by a client device.

Step 220: Obtain a corresponding static image based on the received image generation request.

The static image here is an image stored in the image material storage module 101, and includes static information needed for generating a majority of images awaiting generation. For example, the static image can be a background image, a foreground image, or a LoGo image.

When a user of the client device wants to generate an image, the user can send an image generation request to the image generation service module 102. The image generation request includes an image format of the image awaiting generation, and the image format can be JPEG, TIFF, RAW, BMP, GIF, PNG, etc. In an example, when a user of a payment client device wants to generate a 2D code image (for example, a 2D code image in a PNG format) that is in a specific format and that includes user information, the user can send an image generation request to the image generation service module 102. The image generation request can further include the user information (e.g., a user account and a user avatar). After receiving the image generation request that includes the user information, the image generation service module 102 generates corresponding 2D code information based on the user information. In addition, the image generation request can further include a name of a background image and/or a name of a foreground image. If the image generation request includes the name of the background image and/or the name of the foreground image, the image generation service module 102 obtains the corresponding background image and/or foreground image from the image material storage module 101 based on the name of the background image and/or the name of the foreground image. Otherwise, the image generation service module 102 directly obtains a default background image and/or foreground image from the image material storage module 101.

Step 230: Determine a plurality of sub-images awaiting generation of the image awaiting generation based on the image format.

Figure 3:
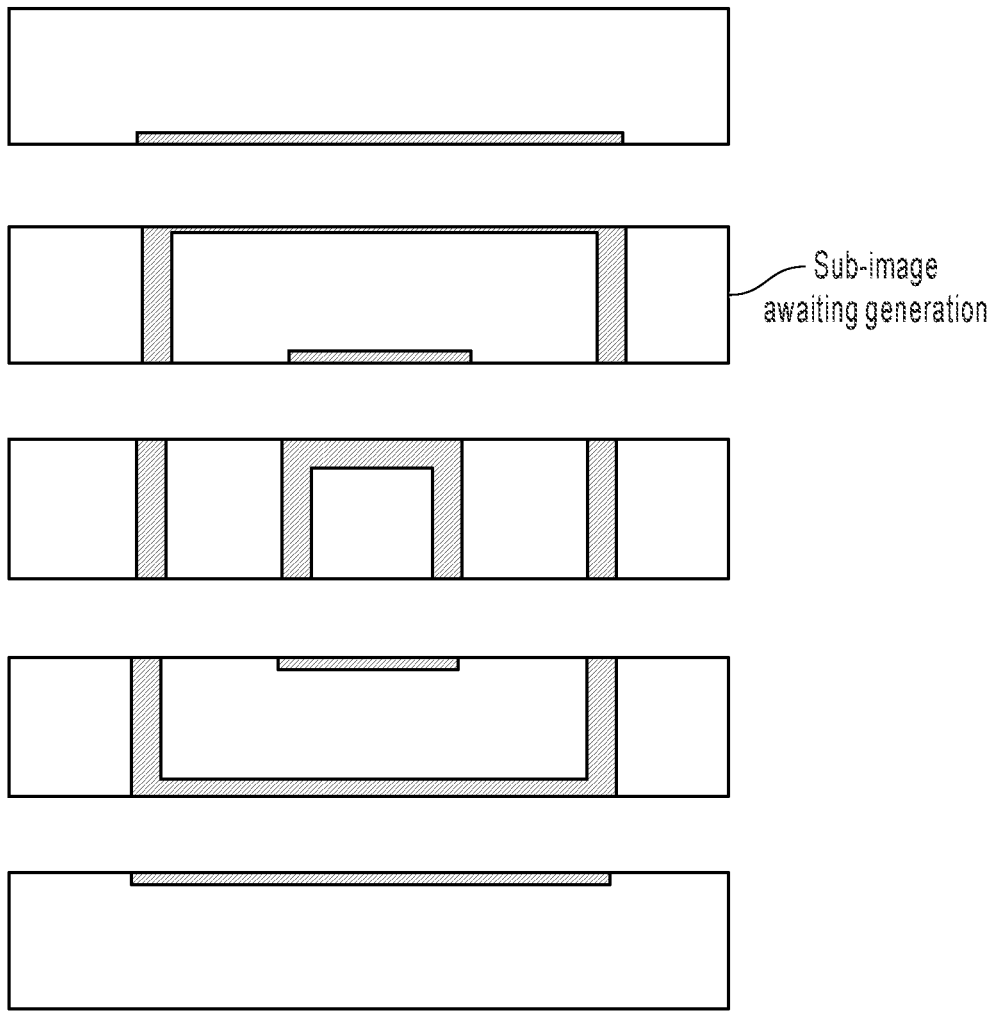
FIG. 3 is a schematic diagram illustrating a sub-image awaiting generation, according to the present application.

The sub-images awaiting generation here are obtained by dividing the image awaiting generation. In an example, when the image awaiting generation is a 2D code image that is in a PNG format and that includes user information, the plurality of determined images awaiting generation can be shown as in FIG. 3. In FIG. 3, five sub-images awaiting generation are determined, and each sub-image awaiting generation is one row of pixels in an image awaiting generation.

Step 240: Obtain description information of each sub-image awaiting generation, and sort the plurality of sub-images awaiting generation based on the description information.

The description information of the sub-image awaiting generation includes the number of pixels included in the sub-image awaiting generation and location information of each pixel in the sub-image awaiting generation.

After obtaining the corresponding static image from the image material storage module 101, the image generation service module 102 in FIG. 1 can forward the image format of the image awaiting generation, the static image, and the 2D code information to the block generation module 104. Then the block generation module 104 can send an access request to the synthesis mode decision module 103. The access request can include the image format of the image awaiting generation. The synthesis mode decision module 103 determines, based on the image format of the image awaiting generation, whether the image awaiting generation can be generated in blocks. If the image awaiting generation can be generated in blocks, the synthesis mode decision module 103 determines a plurality of images awaiting generation, and obtains description information of each image awaiting generation. For example, assume that the image awaiting generation is a 1024×1024 PNG image, a determination result of the synthesis mode decision module 103 is that the image awaiting generation can be generated in blocks. A total of 1024 sub-images awaiting generation can be determined, each sub-image awaiting generation includes 1024 pixels, and the 1024 pixels are all in one row (e.g., all in the first row or the second row). Then, the 1024 sub-images awaiting generation can be sorted, for example, the 1024 sub-images awaiting generation can be sorted based on a row in which pixels included in each sub-image awaiting generation are located, and the sorted sub-images awaiting generation respectively correspond to the first row, the second row, . . . , and the 1024th row of the image awaiting generation.

For another example, if the image awaiting generation is a 1024×1024 JPEG image, because an image in a JPEG format is displayed in grids, it can be further assumed that the image awaiting generation includes 64×64 grids, and each grid includes 16×16 pixels, a determination result of the synthesis mode decision module 103 is that the image awaiting generation can be generated in blocks. The image awaiting generation can be divided into a total of 64 sub-images awaiting generation. Each sub-image awaiting generation includes 16×16 pixels. In other words, each sub-image awaiting generation includes the pixels in one grid. Then, the 64 sub-images awaiting generation can be sorted, for example, the 64 sub-images awaiting generation can be sorted based on a location of a grid in which pixels included in each sub-image awaiting generation are located, and the sorted sub-images awaiting generation respectively correspond to the first grid, the second grid, . . . , and the 64th grid that are arranged in the image awaiting generation from top to bottom and from left to right.

After sorting the plurality of sub-images awaiting generation, the synthesis mode decision module 103 can send description information of the sorted sub-images awaiting generation and a predetermined image generation algorithm to the block generation module 104.

Step 250: Generate the first sub-image based on description information of the first sub-image awaiting generation in the plurality of sorted sub-images awaiting generation, a predetermined image generation algorithm, and the static image.

It is worthwhile to note that the first sub-image awaiting generation can be a sub-image awaiting generation that is arranged at the foremost location.

It can be understood that the image awaiting generation usually includes a plurality of pixels (e.g., 1024×1024 pixels), and the predetermined image generation algorithm may describe a method for generating each pixel. Generation of a first pixel is used as an example. The first pixel here can be any pixel, and the predetermined image generation algorithm can be as follows:

A foreground pixel at a corresponding location in a foreground image is read based on location information of the first pixel, and the read foreground pixel is used as the first pixel. Alternatively, a background pixel at a corresponding location in a background image is read based on location information of the first pixel, and the read background pixel is used as the first pixel. Alternatively, a foreground pixel at a corresponding location in a foreground image is read based on location information of the first pixel, a background pixel at a corresponding location in a background image is read based on the location information of the first pixel, and the combination of the foreground pixel and the background pixel is used as the first pixel. It is worthwhile to note that the foreground pixel is a pixel in the foreground image, and the background pixel is a pixel in the background image.

The generating the first sub-image based on description information of the first sub-image awaiting generation, a predetermined image generation algorithm, and the static image in step 250 can be as follows: reading the location information of the first pixel in the first sub-image awaiting generation based on the description information of the first sub-image awaiting generation; reading a pixel at a corresponding location in the static image based on the location information; and determining the first pixel based on the pixel at the corresponding location and the predetermined image generation algorithm, and so on, until each pixel in the first sub-image awaiting generation is determined, to generate the first sub-image.

In actual applications, the first pixel can be generated with reference to a corresponding description file (e.g., the 2D code information). The description file here describes a location, a color, etc. of at least one pixel in the image awaiting generation.

Generation of a 1024×1024 2D code image that is in a PNG format and that includes user information is used as an example.

The first sub-image awaiting generation that is determined by the synthesis mode decision module 103 can include pixels in the first row. To be specific, the first sub-image awaiting generation can include 1024 pixels. Assume that descriptions of the pixels in the first sub-image awaiting generation in 2D code information are as follows: the first pixel in the first row is black, the second pixel in the first row is white, . . . , and the 1024th pixel in the first row is white. When the first pixel in the first row is generated, in other words, when the first pixel in the first sub-image awaiting generation is generated, the first foreground pixel in the first row in a foreground image is read, and the first foreground pixel in the first row is used as the first pixel in the first sub-image awaiting generation. When the second pixel in the first row is generated, in other words, when the second pixel in the first sub-image awaiting generation is generated, the second background pixel in the first row in a background image is read, and the second background pixel in the first row is used as the second pixel in the first sub-image awaiting generation, and so on, until the 1024th pixel in the first sub-image awaiting generation is determined. It can be understood that after the 1024th pixel is generated, in other words, after the last pixel in the first sub-image awaiting generation is generated, the first sub-image is generated.

It is worthwhile to note that in step 250, each time the block generation module 104 generates a pixel in a sub-image, the block generation module 104 stores the pixel in the block storage module 105, until the block storage module 105 stores all pixels in the sub-image, in other words, until the block storage module 105 stores 1024 pixels as described in the previous example. Then, the block generation module 104 sends all the pixels in the sub-image and the format of the image awaiting generation to the block encoding and compression module 106. It can be understood that after the block generation module 104 sends all the pixels in the sub-image to the block encoding and compression module 106, the block storage module 105 can be configured to store all pixels in the next sub-image. In other words, the block storage module 105 in the present application can be reused, thereby improving memory resource utilization. In addition, the block storage module 105 in the present application is only configured to store all pixels in one sub-image instead of storing complete information of the entire image, thereby saving memory resources of a computer.

Step 260: Preprocess the first sub-image, and add the preprocessed first sub-image to an image file that satisfies the image format.

The preprocessing here can include encoding, compressing, etc.

It can be understood that, to reduce storage space of an image, images stored in external storage space of the computer are generally encoded and compressed images. However, images in different image formats may correspond to different methods for encoding and compressing. After receiving all pixels in the first sub-image and the image format of the image awaiting generation, the block encoding and compression module 106 can encode and compress the first sub-image based on the image format of the image awaiting generation. Encoding and compression processes of images in different image formats are conventional common technologies. Details are omitted here for simplicity.

After encoding and compressing the first sub-image, the block encoding and compression module 106 sends the encoded and compressed first sub-image and the image format of the image awaiting generation to the file generation module 107. It can be understood that the file generation module 107 can initially generate an image file that satisfies the image format of the image awaiting generation. The image file includes only description information of the image format of the image awaiting generation, and does not include any pixel. Each time the file generation module 107 receives an encoded and compressed sub-image sent by the block encoding and compression module 106, the file generation module 107 adds the encoded and compressed sub-image to the image file.

It can be understood that the encoded and compressed sub-image is stored in external storage space (e.g., a disk), and the sub-image no longer occupies memory space. Therefore, memory resources of the computer are saved.

Step 270: Sequentially perform operations of generating, preprocessing, and adding other sub-images awaiting generation in the plurality of sorted sub-images awaiting generation based on a method for generating, preprocessing, and adding the first sub-image, until the image awaiting generation is obtained.

As described in the previous example, the second sub-image (including 1024 pixels in the second row) can be generated according to the method for generating the first sub-image. Then, the second sub-image is preprocessed, and the preprocessed second sub-image is added to the image file, and so on, until the 1024th sub-image is generated and the preprocessed 1024th sub-image is added to the image file. When adding all the sub-images to the image file, the file generation module 107 adds necessary information (e.g., security check information or integrity check information) to the image file. Then, the image awaiting generation is generated.

According to the image generation method provided in the present application, the description information of each sub-image awaiting generation of the image awaiting generation is determined based on the image format of the image awaiting generation, the sub-images awaiting generation are sorted based on the description information, and the sub-images are generated in sequence. In a process of generating the sub-images in sequence, each time a sub-image is generated, the sub-image is added to the image file after being preprocessed. When all the sub-images are stored in the image file, all the sub-images form the image awaiting generation. It can be seen that the sub-images are generated in sequence in the present application. In other words, only information about one sub-image needs to be stored in a memory, thereby alleviating the problem in the existing technology that the memory resources of the computer are wasted because complete information of the image awaiting generation needs to be stored in the memory.

Figure 4:
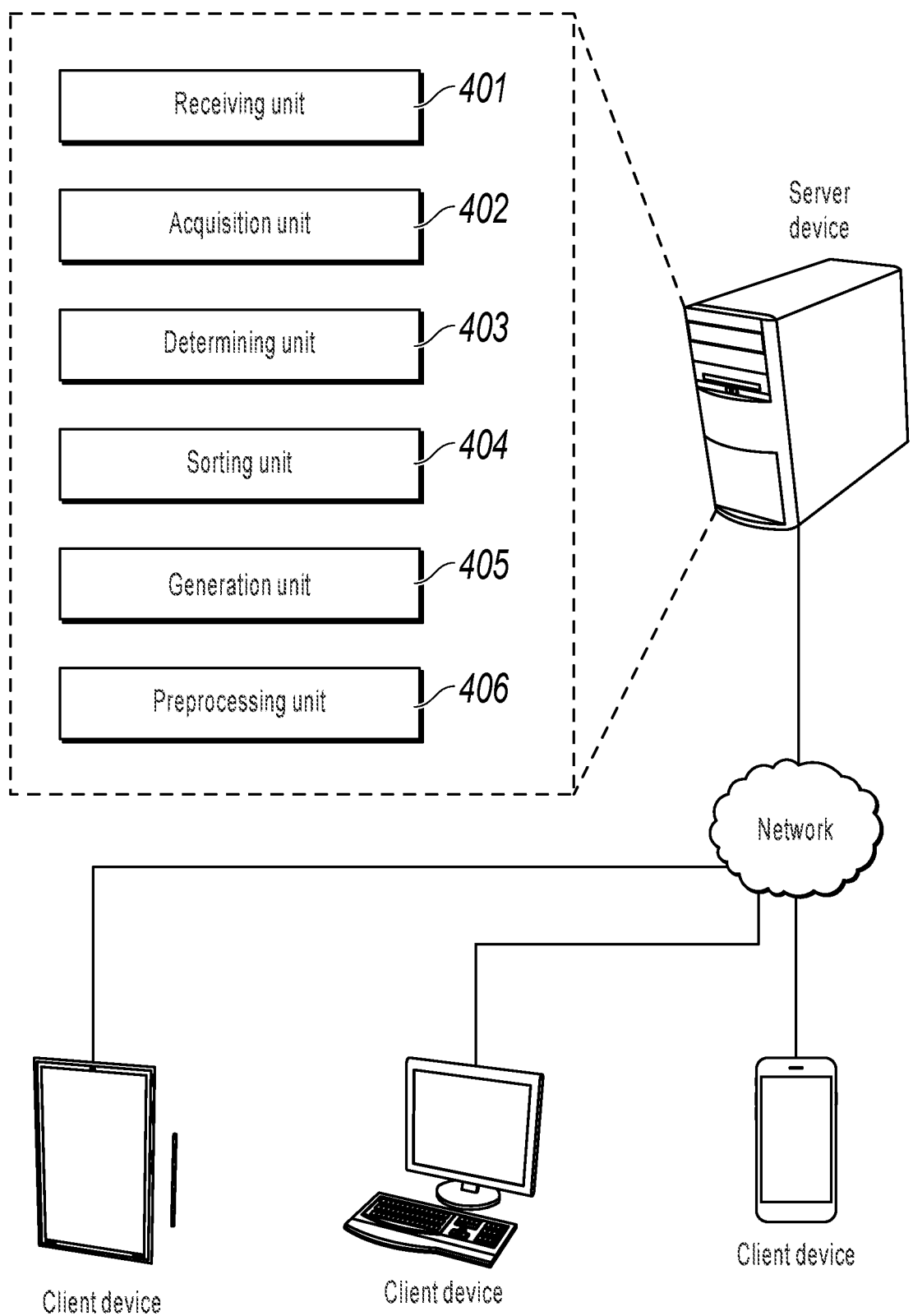
FIG. 4 is a schematic diagram illustrating an image generation device, according to another implementation of the present application.

Corresponding to the image generation method, an implementation of the present application further provides an image generation device. As shown in FIG. 4, the device includes a receiving unit 401, an acquisition unit 402, a determining unit 403, a sorting unit 404, a generation unit 405, and a preprocessing unit 406.

The receiving unit 401 is configured to receive an image generation request. The image generation request includes an image format of an image awaiting generation.

The acquisition unit 402 is configured to obtain a corresponding static image based on the image generation request received by the receiving unit 401.

The determining unit 403 is configured to determine a plurality of sub-images awaiting generation of the image awaiting generation based on the image format.

The sorting unit 404 is configured to obtain description information of each sub-image awaiting generation that is determined by the determining unit 403, and sort the plurality of sub-images awaiting generation based on the description information.

The description information can include the number of pixels included in the sub-image awaiting generation and location information of each pixel in the sub-image awaiting generation.

The generation unit 405 is configured to generate the first sub-image based on description information of the first sub-image awaiting generation in the plurality of sub-images awaiting generation that are sorted by the sorting unit 404, a predetermined image generation algorithm, and the static image.

The generation unit 405 is configured to read location information of the first pixel in the first sub-image awaiting generation based on the description information of the first sub-image awaiting generation; read a pixel at a corresponding location in the static image based on the location information; and determine the first pixel based on the pixel at the corresponding location and the predetermined image generation algorithm, and so on, until each pixel in the first sub-image awaiting generation is determined, to generate the first sub-image.

The preprocessing unit 406 is configured to preprocess the first sub-image generated by the generation unit 405, and add the preprocessed first sub-image to an image file that satisfies the image format.

The acquisition unit 402 is further configured to sequentially perform operations of generating, preprocessing, and adding other sub-images awaiting generation in the plurality of sorted sub-images awaiting generation based on a method for generating, preprocessing, and adding the first sub-image, until the image awaiting generation is obtained.

Optionally, the static image includes a foreground image and/or a background image.

The reading a pixel at a corresponding location in the static image based on the location information, and determining the first pixel based on the pixel at the corresponding location and the predetermined image generation algorithm is as follows: reading a foreground pixel at the corresponding location in the foreground image based on the location information, and using the foreground pixel as the first pixel; or reading a background pixel at the corresponding location in the background image based on the location information, and using the background pixel as the first pixel; or reading a foreground pixel at the corresponding location in the foreground image based on the location information, reading a background pixel at the corresponding location in the background image based on the location information, and using the combination of the foreground pixel and the background pixel as the first pixel.

Optionally, the image generation request can further include user information.

The generation unit 405 is further configured to generate 2D code information based on the user information; and generate the first sub-image based on the description information of the first sub-image awaiting generation, the predetermined image generation algorithm, the static image, and the 2D code information.

Functions of function modules of the device in the present implementation of the present application can be implemented by performing the steps in the previous method implementation. A specific working process of the device provided in the present application is omitted here for simplicity.

According to the image generation method and device provided in the implementations of the present application, the receiving unit 401 receives the image generation request, where the image generation request includes the image format of the image awaiting generation; the acquisition unit 402 obtains the corresponding static image based on the received image generation request; the determining unit 403 determines the plurality of sub-images awaiting generation of the image awaiting generation based on the image format; the sorting unit 404 obtains the description information of each sub-image awaiting generation, and sorts the plurality of sub-images awaiting generation based on the description information; the generation unit 405 generates the first sub-image based on the description information of the first sub-image awaiting generation in the plurality of sorted sub-images awaiting generation, the predetermined image generation algorithm, and the static image; the preprocessing unit 406 preprocesses the first sub-image, and adds the preprocessed first sub-image to the image file that satisfies the image format; and the acquisition unit 402 sequentially performs the operations of generating, preprocessing, and adding the other sub-images awaiting generation in the plurality of sorted sub-images awaiting generation, based on the method for generating, preprocessing, and adding the first sub-image, until the image awaiting generation is obtained. Therefore, memory resources of a computer are saved.

A person skilled in the art can be further aware that, in combination with the examples described in the implementations disclosed in the present specification, objects and algorithm steps can be implemented by electronic hardware, computer software, or a combination thereof. To clearly describe interchangeability between the hardware and the software, compositions and steps of each example are described above based on functions. Whether the functions are performed by hardware or software depends on particular applications and design constraint conditions of the technical solutions. A person skilled in the art can use different methods to implement the described functions for each particular application, but it should not be considered that the implementation goes beyond the scope of the present application.

Steps of methods or algorithms described in the implementations disclosed in the present specification can be implemented by hardware, software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific implementations, the objective, technical solutions, and benefits of the present application are further described in detail. It should be understood that the descriptions are merely specific implementations of the present application, but are not intended to limit the protection scope of the present application. Any modification, equivalent replacement, or improvement made without departing from the spirit and principle of the present application should fall within the protection scope of the present application.

Figure 5:
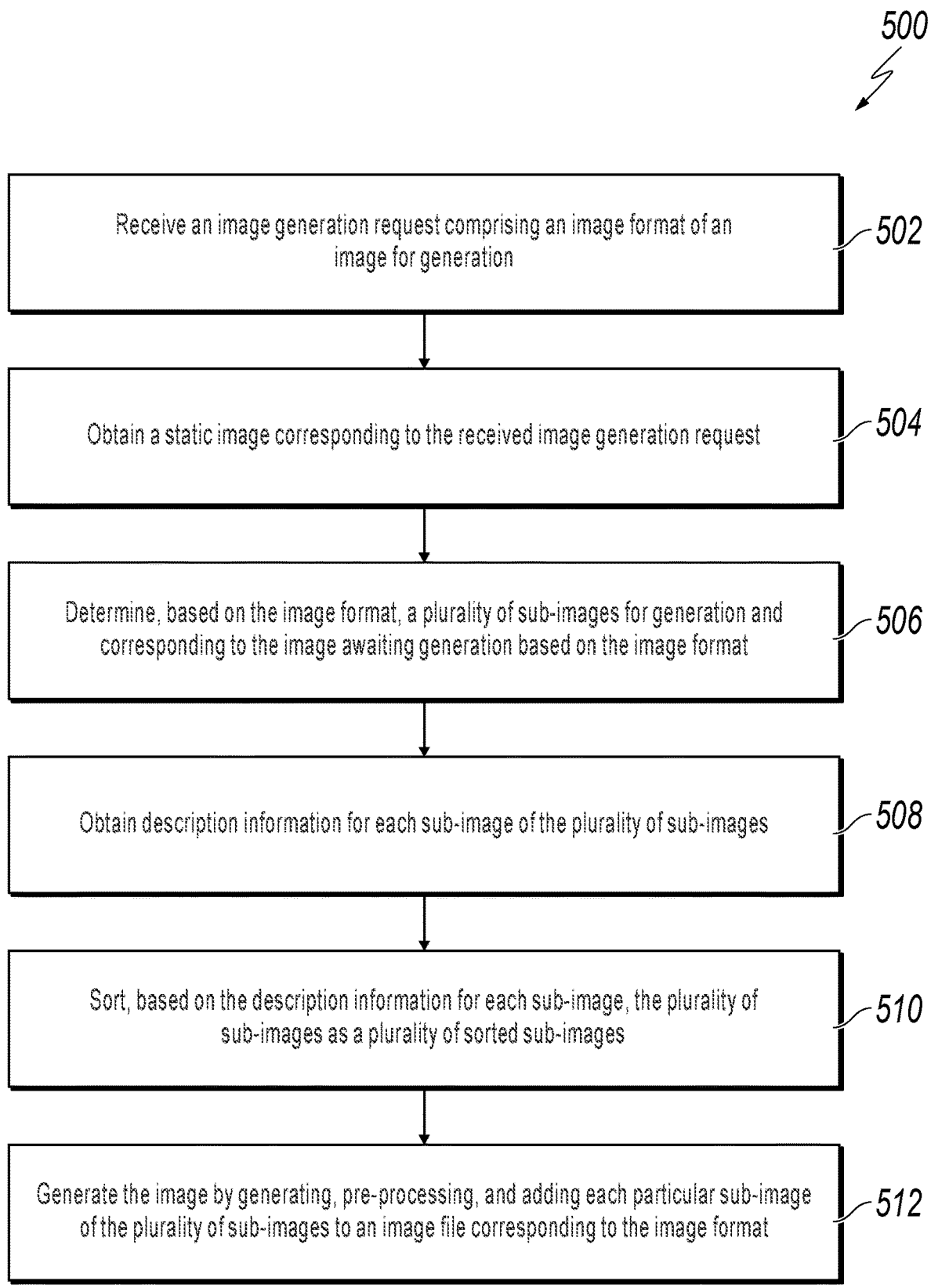
FIG. 5 is a flowchart illustrating an example of a computer-implemented method for saving memory resources of a computer, according to an implementation of the present disclosure.

FIG. 5 is a flowchart illustrating an example of a computer-implemented method 500 for saving memory resources of a computer, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, an image generation request is received, where the image generation request includes an image format of an image for generation. In some implementations, the image generation request further includes user information and generating the particular sub-image based on description information of the particular sub-image for generation, a predetermined image generation algorithm, and the static image, includes: 1) generating two-dimensional code information based on the user information and 2) generating the particular sub-image based on the description information of the particular sub-image for generation, the predetermined image generation algorithm, the static image, and the two-dimensional code information. From 502, method 500 proceeds to 504.

At 504, a static image corresponding to the received image generation request is obtained. In some implementations, the static image includes a foreground image or a background image or both a foreground image and a background image. From 504, method 500 proceeds to 506.

At 506, based on the image format, a plurality of sub-images for generation and corresponding to the image awaiting generation based on the image format is determined. From 506, method 500 proceeds to 508.

At 508, description information is obtained for each sub-image of the plurality of sub-images. From 508, method 500 proceeds to 510.

At 510, based on the description information for each sub-image, the plurality of sub-images are sorted as a plurality of sorted sub-images. From 510, method 500 proceeds to 512.

At 512, the image is generated by generating, pre-processing, and adding each particular sub-image of the plurality of sub-images to an image file corresponding to the image format. In some implementations, generating the image includes: 1) generating a particular sub-image based on description information associated with a particular sub-image for generation of the plurality of sorted sub-images, a predetermined image generation algorithm, and the static image, 2) pre-processing the particular sub-image, and 3) adding the particular sub-image to the image file corresponding to the image format. In some implementations, the description information includes the number of pixels of the sub-image for generation and location information of each pixel in the sub-image for generation. In some implementations, generating the particular sub-image includes, for each particular pixel in the particular sub-image for generation: 1) reading location information of the particular pixel in the particular sub-image for generation, 2) reading a pixel at a corresponding location in the static image based on the location information, and 3) determining the particular pixel based on the pixel at the corresponding location and the predetermined image generation algorithm. In some implementations, reading the pixel at the corresponding location in the static image based on the location information and determining the particular pixel based on the pixel at the corresponding location and the predetermined image generation algorithm, includes: 1) reading a foreground pixel at the corresponding location in the foreground image based on the location information and using the foreground pixel as the particular pixel, 2) reading a background pixel at the corresponding location in the background image based on the location information, and using the background pixel as the particular pixel, or reading a foreground pixel at the corresponding location in the foreground image based on the location information, reading a background pixel at the corresponding location in the background image based on the location information, and using the combination of the foreground pixel and the background pixel as the particular pixel. After 512, method 500 can stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    receiving an image generation request, wherein the image generation request comprises an image format of an image for generation;
    obtaining a static image corresponding to the received image generation request;
    determining, based on the image format, a plurality of sub-images for generation and corresponding to the image awaiting generation based on the image format;
    obtaining description information for each sub-image of the plurality of sub-images;
    sorting, based on the description information for each sub-image, the plurality of sub-images as a plurality of sorted sub-images; and generating the image by generating, pre-processing, and adding each particular sub-image of the plurality of sub-images to an image file corresponding to the image format, wherein generating the image comprises:
  generating a particular sub-image based on description information associated with a particular sub-image for generation of the plurality of sorted sub-images, a predetermined image generation algorithm, and the static image;
  pre-processing the particular sub-image; and
  adding the particular sub-image to the image file corresponding to the image format.

2. The computer-implemented method of claim 1, wherein the description information comprises the number of pixels of the sub-image for generation and location information of each pixel in the sub-image for generation.

3. The computer-implemented method of claim 2, wherein generating the particular sub-image comprises, for each particular pixel in the particular sub-image for generation:
  reading location information of the particular pixel in the particular sub-image for generation;
  reading a pixel at a corresponding location in the static image based on the location information; and
  determining the particular pixel based on the pixel at the corresponding location and the predetermined image generation algorithm.

4. The computer-implemented method of claim 3, wherein the static image comprises a foreground image or a background image or both a foreground image and a background image.

5. The computer-implemented method of claim 4, wherein reading the pixel at the corresponding location in the static image based on the location information and determining the particular pixel based on the pixel at the corresponding location and the predetermined image generation algorithm, comprises:
  reading a foreground pixel at the corresponding location in the foreground image based on the location information and using the foreground pixel as the particular pixel; or
  reading a background pixel at the corresponding location in the background image based on the location information, and using the background pixel as the particular pixel; or
  reading a foreground pixel at the corresponding location in the foreground image based on the location information, reading a background pixel at the corresponding location in the background image based on the location information, and using the combination of the foreground pixel and the background pixel as the particular pixel.

6. The computer-implemented method of claim 1, wherein:
  the image generation request further comprises user information; and
  generating the particular sub-image based on description information of the particular sub-image for generation, a predetermined image generation algorithm, and the static image, comprises:
    generating two-dimensional code information based on the user information; and
    generating the particular sub-image based on the description information of the particular sub-image for generation, the predetermined image generation algorithm, the static image, and the two-dimensional code information.

7. A non-transitory, computer-readable medium storing one or more instructions executable by a computer system to perform operations comprising:
  receiving an image generation request, wherein the image generation request comprises an image format of an image for generation;
  obtaining a static image corresponding to the received image generation request;
  determining, based on the image format, a plurality of sub-images for generation and corresponding to the image awaiting generation based on the image format;
  obtaining description information for each sub-image of the plurality of sub-images;
  sorting, based on the description information for each sub-image, the plurality of sub-images as a plurality of sorted sub-images; and
  generating the image by generating, pre-processing, and adding each particular sub-image of the plurality of sub-images to an image file corresponding to the image format, wherein generating the image comprises:
    generating a particular sub-image based on description information associated with a particular sub-image for generation of the plurality of sorted sub-images, a predetermined image generation algorithm, and the static image;
    pre-processing the particular sub-image; and
    adding the particular sub-image to the image file corresponding to the image format.

8. The non-transitory, computer-readable medium of claim 7, wherein the description information comprises the number of pixels of the sub-image for generation and location information of each pixel in the sub-image for generation.

9. The non-transitory, computer-readable medium of claim 8, wherein generating the particular sub-image comprises, for each particular pixel in the particular sub-image for generation:
  reading location information of the particular pixel in the particular sub-image for generation;
  reading a pixel at a corresponding location in the static image based on the location information; and
  determining the particular pixel based on the pixel at the corresponding location and the predetermined image generation algorithm.

10. The non-transitory, computer-readable medium of claim 9, wherein the static image comprises a foreground image or a background image or both a foreground image and a background image.

11. The non-transitory, computer-readable medium of claim 10, wherein reading the pixel at the corresponding location in the static image based on the location information and determining the particular pixel based on the pixel at the corresponding location and the predetermined image generation algorithm, comprises:
  reading a foreground pixel at the corresponding location in the foreground image based on the location information and using the foreground pixel as the particular pixel; or
  reading a background pixel at the corresponding location in the background image based on the location information, and using the background pixel as the particular pixel; or
  reading a foreground pixel at the corresponding location in the foreground image based on the location information, reading a background pixel at the corresponding location in the background image based on the location information, and using the combination of the foreground pixel and the background pixel as the particular pixel.

12. The non-transitory, computer-readable medium of claim 7, wherein:
the image generation request further comprises user information; and
generating the particular sub-image based on description information of the particular sub-image for generation, a predetermined image generation algorithm, and the static image, comprises:
generating two-dimensional code information based on the user information; and
generating the particular sub-image based on the description information of the particular sub-image for generation, the predetermined image generation algorithm, the static image, and the two-dimensional code information.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving an image generation request, wherein the image generation request comprises an image format of an image for generation;
obtaining a static image corresponding to the received image generation request;
determining, based on the image format, a plurality of sub-images for generation and corresponding to the image awaiting generation based on the image format;
obtaining description information for each sub-image of the plurality of sub-images;
sorting, based on the description information for each sub-image, the plurality of sub-images as a plurality of sorted sub-images; and
generating the image by generating, pre-processing, and adding each particular sub-image of the plurality of sub-images to an image file corresponding to the image format, wherein generating the image comprises:
generating a particular sub-image based on description information associated with a particular sub-image for generation of the plurality of sorted sub-images, a predetermined image generation algorithm, and the static image;
pre-processing the particular sub-image; and
adding the particular sub-image to the image file corresponding to the image format.

14. The computer-implemented system of claim 13, wherein:
the image generation request further comprises user information; and
generating the particular sub-image based on description information of the particular sub-image for generation, a predetermined image generation algorithm, and the static image, comprises:
generating two-dimensional code information based on the user information; and
generating the particular sub-image based on the description information of the particular sub-image for generation, the predetermined image generation algorithm, the static image, and the two-dimensional code information.

15. The computer-implemented system of claim 14, wherein the description information comprises the number of pixels of the sub-image for generation and location information of each pixel in the sub-image for generation.

16. The computer-implemented system of claim 15, wherein generating the particular sub-image comprises, for each particular pixel in the particular sub-image for generation:
reading location information of the particular pixel in the particular sub-image for generation;
reading a pixel at a corresponding location in the static image based on the location information; and
determining the particular pixel based on the pixel at the corresponding location and the predetermined image generation algorithm.

17. The computer-implemented system of claim 16, wherein the static image comprises a foreground image or a background image or both a foreground image and a background image.

18. The computer-implemented system of claim 17, wherein reading the pixel at the corresponding location in the static image based on the location information and determining the particular pixel based on the pixel at the corresponding location and the predetermined image generation algorithm, comprises:
reading a foreground pixel at the corresponding location in the foreground image based on the location information and using the foreground pixel as the particular pixel; or
reading a background pixel at the corresponding location in the background image based on the location information, and using the background pixel as the particular pixel; or
reading a foreground pixel at the corresponding location in the foreground image based on the location information, reading a background pixel at the corresponding location in the background image based on the location information, and using the combination of the foreground pixel and the background pixel as the particular pixel.

* * * * *